United States Patent
Slagt et al.

(10) Patent No.: US 12,239,970 B2
(45) Date of Patent: Mar. 4, 2025

(54) METHOD FOR REDUCING DILUTION EFFECTS IN FLUID TREATMENT VESSELS

(71) Applicants: SPECIALTY ELECTRONIC MATERIALS NETHERLANDS BV, Hoek (NL); DDP SPECIALTY ELECTRONIC MATERIALS US, LLC, Wilmington, DE (US)

(72) Inventors: J. Marcus Slagt, Nisse (NL); Maria de los angeles Perez Macia, Madrid (ES)

(73) Assignees: DDP SPECIALTY ELECTRONIC MATERIALS US, LLC, Wilmington, DE (US); SPECIALTY ELECTRONIC MATERIAL NETHERLANDS BV, Dordrecht (NL)

( * ) Notice: Subject to any disclaimer, the term of this patent is extended or adjusted under 35 U.S.C. 154(b) by 776 days.

(21) Appl. No.: 17/293,173

(22) PCT Filed: Nov. 19, 2019

(86) PCT No.: PCT/US2019/062106
§ 371 (c)(1),
(2) Date: May 12, 2021

(87) PCT Pub. No.: WO2020/112427
PCT Pub. Date: Jun. 4, 2020

(65) Prior Publication Data
US 2022/0001373 A1    Jan. 6, 2022

Related U.S. Application Data

(60) Provisional application No. 62/771,619, filed on Nov. 27, 2018.

(51) Int. Cl.
*B01J 47/022* (2017.01)
*B01J 49/05* (2017.01)
*B01J 49/50* (2017.01)

(52) U.S. Cl.
CPC ............ *B01J 47/022* (2013.01); *B01J 49/05* (2017.01); *B01J 49/50* (2017.01)

(58) Field of Classification Search
CPC ........... B01J 47/022; B01J 49/05; B01J 49/60
See application file for complete search history.

(56) References Cited

U.S. PATENT DOCUMENTS

| 4,269,715 A | 5/1981 | Barraque et al. |
| 2014/0263069 A1* | 9/2014 | Vaughan .......... C02F 1/42 210/287 |

FOREIGN PATENT DOCUMENTS

| EP | 0497632 A1 | 8/1992 | |
| EP | 0551002 A1 | 7/1993 | |
| JP | 1997-57116 A | 3/1997 | |
| JP | 2001205263 A | 7/2001 | |
| RO | 121020 B1 * | 11/2006 | ........ C02F 1/42 |

OTHER PUBLICATIONS

Amberlite(TM) 62i Inert Resin Product Data Sheet, pp. 1-3, May 2018 (Year: 2018).*
Machine-generated translation of RO 121020 B1, four pages; retrieved from ESPACENET on Mar. 15, 2024. (Year: 2006).*
Wadell, "Volume, Shape, and Roundness of Rock Particles", Journal of Geology, University of Chicago Press, Chicago, IL, US, vol. 40, Jan. 1, 1932, pp. 443-451.
Anonymous, "Product Data Sheet Amberlite(TM) 62i Inert Resin Polyethylene, Inert Resin for Industrial Demineralization Applications", May 1, 2018, Retrieved from the Internet: URL:https://www.lenntech.com/Data-sheets/DOW-177-03820-62i-L.pdf, pp. 1-3.
International Search Report and Written Opinion in International Application No. PCT/US2019/062106, issued Feb. 21, 2020.
Anonymous, "Product Data Sheet Amberlite (TM) 14i Inert Resin Polypropylene, Inert Resin for Industrial Demineralization Applications", Retrieved from the Internet: URL:https://www.lenntech.com/Data-sheets/DOW-177-03819-14i-L.pdf, May 1, 2018, pp. 1-3.

* cited by examiner

*Primary Examiner* — Fred M Teskin

(57) ABSTRACT

A fluid treatment apparatus comprising a tank containing a bed of at least one fluid treatment medium, a distributor plate separating the bed from an end portion of the tank, and an inert medium comprising amorphous particles having a harmonic mean diameter from 2.5 to 250 mm and a density from 0.57 to 0.998 cm³/g. The volume of the end portion containing inert medium is from 25 to 95% of the total volume of the end portion.

6 Claims, No Drawings

METHOD FOR REDUCING DILUTION EFFECTS IN FLUID TREATMENT VESSELS

BACKGROUND

This invention relates generally to a method for reducing dilution effects in fluid treatment vessels.

Ion Exchange Resins are regenerated with a chemical solution once they are exhausted. The volume of regeneration liquid depends in part on the concentration of the liquid. Free water present in a vessel will negatively influence the effectiveness of the regeneration, leading to lower operating capacity, increased chemical consumption and more waste. For example, US2014/0263069 discloses the use of filler material in the end portions of the vessel, i.e., those portions not containing a fluid treatment medium. However, this reference does not disclose an efficient method.

STATEMENT OF INVENTION

The present invention is directed to a fluid treatment apparatus comprising:
(a) a tank comprising a bed of at least one fluid treatment medium,
(b) a distributor plate separating the bed from an end portion of the tank, and
(c) at least one inert medium comprising amorphous particles having a harmonic mean diameter from 2.5 to 250 mm and a density from 0.57 to 0.998 cm³/g;
wherein volume of the end portion containing inert medium is from 25 to 95% of total volume of the end portion.

DETAILED DESCRIPTION

All percentages are weight percentages (wt %), and all temperatures are in ° C., unless otherwise indicated. Averages are arithmetic averages unless indicated otherwise. All operations are performed at room temperature (18 and 25° C.) unless specified otherwise. Weight average molecular weights, Mw, are measured by gel permeation chromatography (GPC) using polyacrylic acid standards, as is known in the art. The techniques of GPC are discussed in detail in Modern Size Exclusion Chromatography, W. W. Yau, J. J. Kirkland, D. D. Bly; Wiley-Interscience, 1979, and in A Guide to Materials Characterization and Chemical Analysis, J. P. Sibilia; VCH, 1988, p. 81-84. The molecular weights reported herein are in units of daltons. Percentages of monomer units in a polymer are based on total polymer weight (dry weight). The "harmonic mean diameter" (HMD) is defined by the following equation:

$$HMD = \frac{N}{\sum_{i=1}^{N}\left(\frac{1}{d_i}\right)}$$

where i is an index over the individual beads; di is the diameter of each individual particle; and N is the total number of beads. A particle that is not spherical is considered to have a diameter equal to the diameter of a sphere having the same volume as the particle. "Sphericity" ($\Psi$) is the degree to which a particle is spherical and is characterized by using two of the three principal orthogonal axes of the object, a (longest), b (intermediate), and c (shortest), as follows: $\Psi=c/a$. "Roundness" (R) is defined as the ratio of the average radius of curvature of the corners and edges of an object's silhouette to the radius of the largest circle which can be inscribed within the silhouette. Sphericity and roundness are described in more detail in H. Waddell, *The Journal of Geology*, vol. 41, pp. 310-331 (1933).

The volume of the end portion containing inert medium is defined by the upper boundary of the inert medium when at rest. For example, if one defines a plane touching all of the uppermost particles of inert medium, i.e., a plane defining an upper surface of the inert medium, then the volume of the end portion below this plane is the volume of the end portion containing inert medium. For clarity, this is not the total volume of the particles themselves. Preferably, the volume of the lower end portion containing inert medium is at least 30% of the volume of the lower end portion, preferably at least 35%, preferably at least 40%, preferably at least 45%, preferably at least 50%; preferably no more than 90%, preferably no more than 85%.

Preferably, the amorphous particles have an average sphericity from 0.7 to 1.0 and an average roundness from 0.4 to 1.0. Preferably, average sphericity is at least 0.75, preferably at least 0.80; preferably no more than 0.95, preferably no more than 0.92, preferably no more than 0.90. Preferably, average roundness is at least 0.45, preferably at least 0.50, preferably at least 0.55; preferably no more than 0.95, preferably no more than 0.90, preferably no more than 0.85, preferably no more than 0.80, preferably no more than 0.75, preferably no more than 0.70. Preferably, the average sphericity and the average roundness are not both greater than 0.95, preferably 0.90.

Preferably, the amorphous particles have a harmonic mean diameter no greater than 150 mm, preferably no greater than 100 mm, preferably no greater than 50 mm, preferably no greater than 25 mm, preferably no greater than 10 mm, preferably no greater than 6 mm.

Preferably, the amorphous particles have a density of at least 0.60 cm³/g, preferably at least 0.65 cm³/g, preferably at least 0.70 cm³/g, preferably at least 0.75 cm³/g, preferably at least 0.80 cm³/g, preferably at least 0.85 cm³/g. Preferably, the amorphous particles have a density no greater than 0.997 cm³/g, preferably no greater than 0.996 cm³/g.

Typical end portions (also known as dish heads) of tanks used for fluid treatment include, e.g., Klöpper heads, elliptical heads and spheroid heads. Typically, dish head water volume is 15-35% of the installed resin volume in the main portion of the tank and dish head water volume is 40-100% of the resin void water in the main compartment. Preferably, the main portion of the tank is cylindrical.

Reduction of void water due to the presence of inert material in the end portions is calculated as follows for a spheroid end portion.
$V_s$=spheroid compartment volume
$V_{sx}'$=the spheroid remaining free water after (partial) filling of X ml IF62 (ml)
$S_x$=the solid fill of the spheroid volume due to the X ml filling with IF62 (ml)
X=inert filling (ml)
$F_w$=free water (%)

$$V_{sx}'=V_s-(X*F_w)$$

$$S_x=V_s-V_{sx}'$$

Preferably, the fluid treatment medium in the main (center) compartment of the tank is an ion exchange resin, activated carbon, an adsorbent, a non functionalized co polymer or a zeolite. Preferably, the fluid treatment medium is an ion exchange resin, preferably in the form of spherical beads. Preferably, the beads are crosslinked polymer beads. Depending in the Technology Applied:
  Co-flow systems have 10-60% filling
Countercurrent Systems:
  Packed beds: 85%-97.5% filling
  Blocked beds 25-60% filling
  Mixed beds 25-60% filling
  Inert filling in the main compartment (cylinder) depends on the system technology and is either a fixed value ranging from 10-12 cm in an Amberpack/Schwebebett or a range of heights depending on the vessel diameter. Typically <1000 mm: 150 mm; <2500:200 mm and all other over 2500:300 mm
  Or 15-25 cm as block layer in a blocked bed system with air hold down.

EXAMPLES

The equipment used in the present examples was as follows:
  2 PVC columns in parallel for the comparison; Outer diameter 6 cm and column height 1000 mm
  Top and bottom compartments 160 mm wall height equipped with nozzle plates. The compartment represent the vessel spheroid dish head net volume $V_s=350$ ml; the compartment is physically separated from the resin column by a nozzle plates to retain the filling.
  Instrumentation: 8 rotameters,
2 manometers
  Other equipment: 2 water tanks (1m3),
2 chemical tanks (NaOH 30% HCl 37%),
4 pumps (2 feed, 2 dosing)
2 conductivity meters

| IWAKI Electromagnetic Metering pumps | | Model | EWN-B16VCER |
|---|---|---|---|
| Capacity | 65 mL/min · 3.9 L/h · 0.09-0.18 mL/stroke | Power supply | 100-240 VAC |
| Disch. Press. | 7 bar | Frequency | 50/60 Hz |
| Pressure Max. | 8 bar | Current (Input) | 0.8 A |
| Stroke Length | 50-100% (0.5-1.0 mm) | Power (Input) | 20 W |
| Stroke Rate | 0.1-100 (1-360 spm) | Materials | PVC (head) PTFE + EPDM (diaphragm) |

Example 1: Tests with Upper and/or Lower Compartments Filled

| OPERATING CONDITIONS FOR THE TESTS | |
|---|---|
| Configuration | 1 column |
| Regen. technology | UPCORE ™ |
| Resins | DOWEX ™ MARATHON ™ 1200H |
| | New commercial name Amberlite HPR1200 H |
| | DOWEX ™ UPCORE ™ IF-62 |
| | New commercial name Amberlite 62i |
| Setups | None compartment filled |
| | Bottom compartment filled |
| | Bottom + Top compartment filled |
| Feed water | Raw water after sand filter treatment |
| Regenerant | HCl 4.5% |
| Cycles monitoring | Conductivity measurement |

| DOWEX MARATHON ™ 1200 - UPCORE ™ | |
|---|---|
| Floating inert | DOWEX ™ UPCORE ™ IF-62 |
| Floating inert height[1] (mm) | 85 |
| Freeboard (mm) | 50 |
| Filling inert | DOWEX ™ UPCORE ™ IF-62 |
| Volume of filling inert[2] (L) | 0.350 |
| Volume of resin in swollen form (L) | 1.89 |
| Resin height (mm) | 865 |

| COMPACTION | |
|---|---|
| Direction | UPFLOW |
| Influent | Demineralized water |
| Flow rate (L/h) | 60 |
| Linear velocity (m/h) | 30.6 |

| REGENERANT INJECTION | |
|---|---|
| Direction | UPFLOW |
| Regenerant | HCl 35% w/w % |
| Quantity (g/$L_R$) | 120 |
| Regenerant solution concentration (w/w %) | 4.5 |
| Flow rate (L/h) | 15.0 |
| Specific flow rate (BV/h) | 8.6 |
| Duration (min) | 18 |
| Linear velocity (m/h) | 7.6 |
| Volume (L) | 4.5 |

| REGENERANT DISPLACEMENT (SLOW RINSE) | |
|---|---|
| Direction | UPFLOW |
| Effluent | Demineralized water |
| Flow rate (L/h) | 15.0 |
| same as during regenerant injection | |
| Specific flow rate (BV/h) | 8.6 |
| End point | Conductivity < 1000 μS/cm |

| SETTLING | |
|---|---|
| Duration (min) | 10 |

| FAST RINSE (RINSE TO QUALITY) | |
|---|---|
| Direction | DOWNFLOW |
| Influent | Demineralized water |
| Flow rate (L/h) | 55.0 |
| same as loading cycle | |
| Specific flow rate (BV/h) | 29.1 |
| same as loading cycle | |
| End point | Conductivity after SBA < 10 μS/cm |

| LOADING CYCLE | |
|---|---|
| Direction | DOWNFLOW |
| Influent | Water after sand filters |
| Flow rate (L/h) | 55.0 |
| Specific flow rate (BV/h) | 29.1 |
| Linear velocity (m/h) | 28 |
| End point | Conductivity after SBA > 2 μS/cm |

|  | Regeneration cycles | | |
| --- | --- | --- | --- |
|  | Loading cycles Op. Cap. (eq/$L_R$) | BV for displacement | AVG BV for fast rinse to reach 10 µS/cm |  |
| No compartment filled | 1.34 ± 0.01 | 5.9 ± 0.2 | 2.06 | Fr = 0% |
| Bottom compartment filled | 1.47 ± 0.07 | 6.2 ± 0.3 | 1.58 | Fr = 66.5% |
| Bottom and Top compartment filled | 1.58 ± 0.03 | 6.2 ± 0.6 | 1.41 | Fr = 66.5% |

[Cations] (eq/liter) = Total cation concentration obtained from the feed water analysis.
VT = Throughput (liter): Total amount of water treated at the resin breakthrough point.
VR = The volume of resin loaded (liter)

$$Op.\ Capacity = \frac{VT \times [Cations]}{VR}\ (Eq/1_{resin})$$

Compared to $F_{wr}$=0% (no filling), the resin operating capacity improves at 100% filling of $V_s$ at $F_{wr}$=66.5%
$F_{wr}$=free water reduction in compartment
$V_s$=spheroid compartment volume
The fast rinse volume to reach 10 µS/cm is improved from 2.06 to 1.41 bed volumes.

Example 2: Tests with Gradual Filling of Lower Compartment

The operating conditions and fill in the main compartment were the same as in Example 1.
Results

| | Operating Capacity | | |
| --- | --- | --- | --- |
| Cycles | % of Compartment Containing Filling | Op. Cap. (eq/$L_R$) | Standard deviation |
| inert filling 0 ml | 0 | 1.31 | 0.06 |
| inert filling 100 ml | 28.6 | 1.44 | 0.06 |
| Inert filling 200 ml | 57.1 | 1.48 | 0.02 |
| Inert filling 300 ml | 85.7 | 1.48 | 0.01 |
| Inert filling 350 ml | 100 | 1.47 | 0.07 |

| | Displacement (BV) | | |
| --- | --- | --- | --- |
| Cycles | % of Compartment Containing Filling | Displacement (BV) | St. Dev. |
| Regen_0 | 0 | 5.8 | 0.3 |
| Regen_100 | 28.6 | 6.2 | 0.4 |
| Regen_200 | 57.1 | 6.9 | 0.3 |
| Regen_300 | 85.7 | 6.3 | 0.2 |
| Regen_350 | 100 | 6.2 | 0.3 |

Displacement performance is substantially independent of the percent of the compartment which contains fill.

The invention claimed is:

1. A fluid treatment apparatus comprising:
   (a) a tank comprising a bed of at least one fluid treatment medium,
   (b) a distributor plate separating the bed from an end portion of the tank, and
   (c) at least one inert medium comprising amorphous particles having a harmonic mean diameter from 2.5 to 250 mm and a density from 0.57 to 0.998 cm$^3$/g;
   wherein the end portion has a total volume; and the volume of the end portion containing inert medium is from 25 to 95% of the total volume of the end portion; and
   wherein the amorphous particles have an average sphericity from 0.7 to 1 and an average roundness from 0.4 to 1.

2. The fluid treatment apparatus of claim 1 in which volume of the end portion containing inert medium is from 30 to 90% of the total volume of the end portion.

3. The fluid treatment apparatus of claim 2 in which the harmonic mean diameter is from 2.5 to 100 mm.

4. The fluid treatment apparatus of claim 3 in which the amorphous particles have an average sphericity from 0.7 to 0.95 and an average roundness from 0.45 to 0.95.

5. The fluid treatment apparatus of claim 4 in which the fluid treatment medium is an ion exchange resin.

6. The fluid treatment apparatus of claim 5 in which volume of a lower end portion containing inert medium is from 40 to 90% of the total volume of the lower end portion.

* * * * *